May 19, 1942.  R. S. BASSETT  2,283,408
BEARING FOR WATER METERS
Filed Dec. 1, 1939
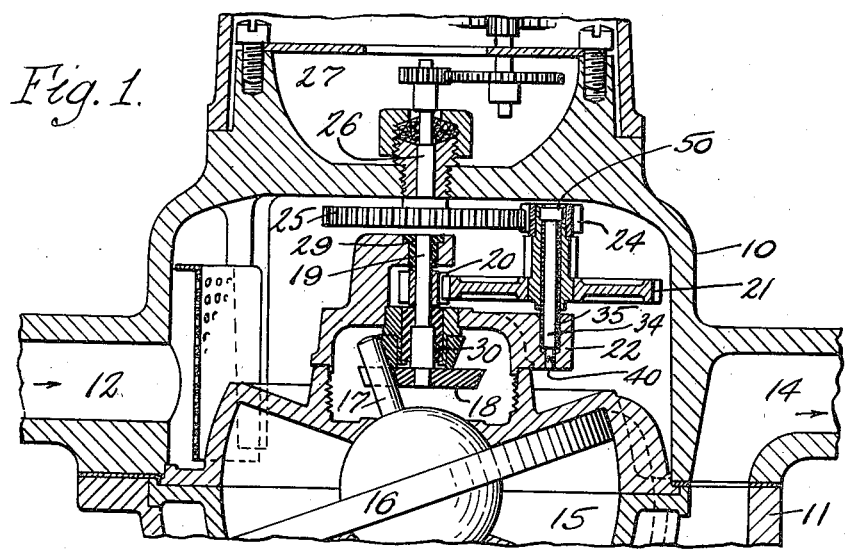
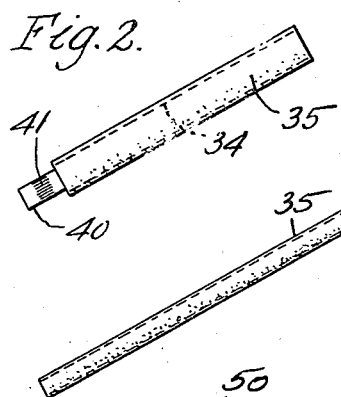
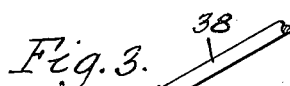
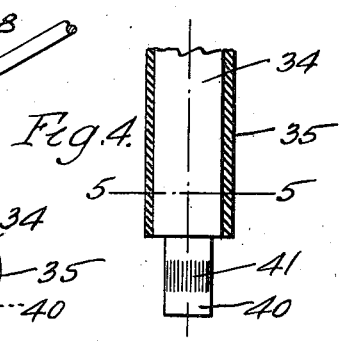
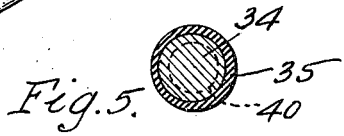
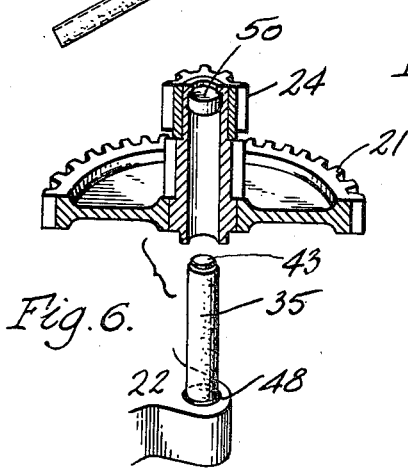
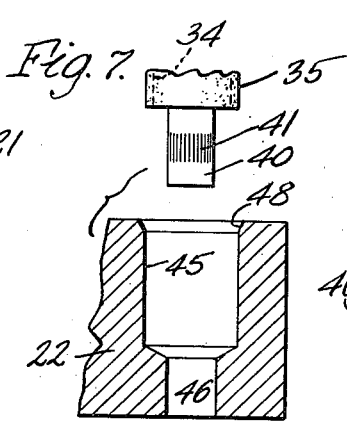
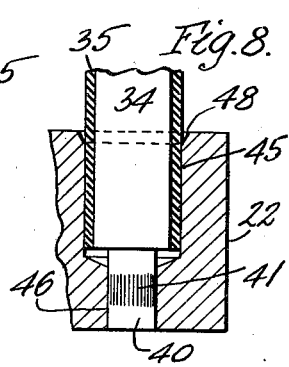
INVENTOR
Robert S. Bassett
By Parker, Rockwell & Farmer
ATTORNEYS Patented May 19, 1942

2,283,408

UNITED STATES PATENT OFFICE 2,283,408

BEARING FOR WATER METERS

Robert S. Bassett, Buffalo, N. Y.

Application December 1, 1939, Serial No. 307,133

5 Claims. (Cl. 73—272)

This invention relates to improvements in water meters, and more particularly to bearings for gearing or other rotatable parts employed for transmitting movement to dials or other measurement indicating means of meters.

One of the objects of this invention is to provide a water meter with improved bearings for gears. Another object is to provide a construction by means of which a water meter gear may be provided with a water lubricated metal and rubber bearing arrangement. Another object is to provide a bearing pin for a water meter of improved construction having a covering of non-metallic bearing material. Another object of this invention is to provide a water meter having a bearing pin of improved construction provided with a shell of non-metallic bearing material and mounted in an improved manner in the meter housing.

Other objects of this invention will appear from the following description and claims.

In the accompanying drawing:

Fig. 1 is a fragmentary central sectional elevation of a water meter having a gear bearing embodying this invention.

Fig. 2 is a side view, on an enlarged scale, of a bearing pin embodying this invention.

Fig. 3 is a side view of a rod covered with a shell of non-metallic bearing material from which bearing pins embodying this invention may be made.

Fig. 4 is a fragmentary view, partly in section, of the lower portion of my improved bearing pin on a still larger scale.

Fig. 5 is a transverse section thereof, on line 5—5, Fig. 4.

Fig. 6 is a fragmentary perspective view, partly in section, of a bearing pin embodying this invention, showing a gear in position to be placed into operative relation to the bearing pin.

Fig. 7 is a fragmentary sectional elevation showing a gear plate of the meter and a bearing pin in a position to be assembled thereon.

Fig. 8 is a similar fragmentary sectional view showing the pin in its operative position on the gear plate.

My improvements in bearings for gears may, of course, be applied to any suitable or desired type of water meter, and in the accompanying drawing, I have shown by way of example one type of meter on which my improvements may be employed. It is not intended, however, to restrict my invention to use with meters of the type shown.

In Fig. 1, 10 represents the upper part of the casing or housing of the meter and 11 the lower part thereof, these two parts being suitably secured together. Water enters the housing through an inlet passage 12, and is discharged therefrom to a discharge passage 14. Within the housing is arranged the usual measuring chamber 15, which contains a measuring or nutating disk 16 having a pin 17, which imparts rotary motion to an arm 18 secured on an upright shaft 19. This shaft has a pinion 20 secured thereto which meshes with a gear 21 operatively supported on a gear supporting member or plate 22 which, in the construction shown, is mounted on the measuring chamber 15 and constitutes a sand cap or closure therefor. The gear 21 shown has a pinion 24 meshing with a gear 25 secured on a shaft 26 which extends through suitable packing into a compartment 27 which may contain the usual registers or dials for indicating the amount of water which has passed through the meter.

It is well known that an excellent water lubricated bearing can be formed by contact of a metal surface with a non-metallic bearing surface, such, for example, as rubber, and consequently, rubber bushings, such for example as the bushings 29 and 30 shown in Fig. 1 and forming bearings for the shaft 19, have heretofore been used for bearings for shafts in water meters. Heretofore, however, gears running on a fixed bearing pin or axle such as the gear 21, have not been provided with stationary bearings of this type because of the difficulties involved to provide such a bearing of the small size necessary, and which would also have sufficient strength and rigidity to enable it to support the gear in accurate relation to the parts with which is cooperates.

In accordance with my invention, I provide a bearing pin for a water meter gear which is made of a core of metal, and which has a shell of non-metallic bearing material arranged about the core. For example, in the construction illustrated, I provide a stationary bearing pin of approximately the same dimensions as those heretofore used in connection with water meter gears and having a metallic core 34 which is slightly smaller in diameter than bearing pins heretofore used, and which has a relatively thin stationary shell 35 of a non-metallic bearing material formed about and firmly gripping the same. Any suitable non-metallic bearing material may be employed, rubber being preferably used, for the reason that it can be readily applied to the core of the bearing pin. The bearing material may be applied to the core in any suitable or desired manner. If the bearing material employed is to be a rubber composition, I preferably proceed as follows:

A metal rod 38 of sufficient length so that a considerable number of bearing pins may be made from the same is immersed in a suitable latex solution. The solution preferably contains the desired vulcanizing or hardening ingredients and when the rod is immersed in the latex solution, rubber will be deposited on the rod in a fairly uniform layer. In the event that the rod is made of an alloy containing copper, I first provide the rod with a protective coating or covering material of any suitable or well known kind which prevents deterioration of the rubber by copper. The rod with the protective coating is then immersed in the latex solution as already described, to form the desired layer of rubber composition about the same, and the composition is then hardened in the usual manner, generally by merely permitting the hardening agents in the latex solution to effect the desired hardening of the rubber composition. The outer surface of this rod may then be ground, for example, in a centerless grinder, for the two-fold purpose of reducing the diameter of the rod to that desired for cooperation with the gear, and also for forming the outer surface of the non-metallic shell of the rod into truly circular or cylindrical form. The rod may then be cut to the desired lengths in any suitable or usual manner, and each length may be cut down at one end thereof to provide a stem or cylindrical projection 40. A part of this stem is then preferably roughened or knurled as indicated at 41. The outer surface of the reduced stem portion 40 is machined in such a manner that it will be concentric with the outer surface of the non-metallic shell. This is desirable for the reason that it is possible that the shell 35 of rubber or other non-metallic bearing material may be somewhat eccentrically disposed with relation to the core 34, as indicated for example in Fig. 4. In such case, the stem 40 should be concentric with the outer surface of the covering material or shell 35 for reasons which will hereinafter be more fully explained.

At the other end of the bearing pin, the shell or covering material may be left flush with the end of the pin, as in Figs. 1 and 2, or in some cases, the shell may be partly removed from the core, as indicated at 43, Fig. 6.

By means of this process, a thin deposit of rubber can be formed on the metal core so that the diameter and strength of the metal core is only slightly less than in the case of all metal pins heretofore commonly employed. The rubber coating not only adheres firmly to the core and remains stationary with it, but furthermore, the rubber shell is under tension due to shrinkage or vulcanization, which further increases the adhesion of the shell to the core.

The foregoing method of forming my improved bearing pins is given merely by way of example, and it is not intended to limit this invention to bearing pins produced in accordance with this method, since it will be obvious that non-metallic shells may be formed on the cores of bearing pins by other methods. It is, for example, quite possible to form these bearing pins by cutting cores to the desired length from a metal rod and then molding the rubber or other non-metallic bearing material about the cores. A rubber shell may be molded about a bearing pin in this manner, and it is also possible to mold thermoplastic or thermosetting materials about a bearing pin core to provide the desired bearing material for a water lubricated bearing.

In order to secure my improved bearing pins on the gear plate or cap 22 of a meter, I provide in the gear plate an aperture 45 which is preferably of such diameter as to receive a portion of the bearing pin which is covered with the non-metallic bearing material. Concentric with the aperture 45, an aperture 46 of smaller diameter is provided in the gear plate 22 into which the stem or extension 40 of the bearing pin may enter. It is because of this construction that the extension 40 of the bearing pin must be made concentric with the outer periphery of the shell of the bearing pin. In order to facilitate the forcing of the shell 35 into the aperture 45, the upper edges of this aperture are preferably tapered as shown at 48, Figs. 7 and 8. When the lower part of the bearing pin is inserted into the apertures in the gear plate 22, the parts will occupy the positions indicated in Fig. 8. The knurled or roughened part 41 of the stem 40 of the bearing pin will securely grip the walls of the aperture 46, and thus hold the bearing pin in correct position. By forcing the end of the bearing pin into the aperture 45, the portion of the shell 35 within the hole will be in compression between the surface of the aperture 46 and the core 34 of the bearing pin so that this shell will be very securely held in place because of this compression, and separation of the covering material from the lower portion of the bearing pin will be entirely prevented by means of this construction.

When the bearing pin has been correctly mounted on the gear plate 22, the gear 21 may be assembled thereon by inserting the bearing pin into the bearing formed in a hub of the gear 21. In the construction shown, this hub is of elongated form and is provided at its upper end with a bearing plug or member 50 which is suitably secured within the cylindrical bearing bore of the gear. This plug may be made of rubber if the outer end of the metal core is exposed, by machining, so as to form a rubber to metal bearing contact. Other materials, such for example as agate, may, however, be used, if desired, for forming a bearing at the upper end of the bushing of the gear 21. This bearing 50 supports the gear upon the bearing pin.

I claim as my invention:

1. In a water meter having a casing containing water during the operation of the meter, a gear rotatably arranged in said casing and normally submerged in water, and a gear supporting member formed by a fixed part of said meter, the combination of a bearing for said gear, said bearing including a metal core having an outer shell of non-metallic bearing material firmly secured to the periphery of said core, said core also having an end part of reduced diameter and concentric with said outer shell, said gear supporting member having an aperture adapted to receive said reduced end of said core, and a portion of said shell, said end of said core extending into said aperture with a portion of said shell held in compression between said core and said aperture.

2. In a water meter having a casing containing water during the operation of the meter, a gear rotatably arranged in said casing and normally submerged in water, and a gear supporting member formed by a fixed part of said meter, the combination of a bearing for said gear, said bearing including a metal core having an outer shell of non-metallic bearing material firmly secured to the periphery of said core and terminating at a distance from one end thereof, said gear supporting member having an aperture, a portion of which is of larger diameter into which said shell may fit tightly, and another portion of which is deeper and of smaller diameter adapted to receive said end of said core which extends beyond said shell, said end of said core and said shell being tightly fitted into said aperture to maintain the portion of said shell in said aperture under compression against said core to secure said shell on said core.

3. In a water metal having a casing containing water during the operation of the meter, a gear rotatably arranged in said casing and normally submerged in water, and a gear supporting member formed by a fixed part of said meter, the combination of a bearing for said gear, said bearing including a metal core having an outer shell of non-metallic bearing material firmly secured to the periphery of said core, said core also having an end part of reduced diameter and concentric with said outer shell and which is roughened on its periphery, said gear supporting member having an aperture formed to receive said bearing, said core having said part of reduced diameter forced into said aperture and said bearing having an adjacent portion which is covered by said shell also arranged in said aperture.

4. In a water meter having a casing containing water during the operation of the meter, a gear rotatably arranged in said casing and normally submerged in water, and a gear supporting member formed by a fixed part of said meter, the combination of a stationary bearing about which said gear may revolve, said bearing including a metal core having an outer shell of non-metallic material firmly secured to its periphery, said gear supporting member having an aperture, an end of said bearing covered by said shell being tightly fitted into said aperture to compress said shell against said core for securely holding said shell against rotation about said core.

5. In a water meter having a casing containing water during the operation of said meter, a gear rotatably arranged in said casing and normally submerged in water, and a gear supporting member formed by a fixed part of said meter, the combination of a bearing about which said gear revolves, said bearing having a metallic core portion, and an outer shell of non-metallic bearing material on the periphery of said core, the metal core of said bearing being exposed at the upper end of said shell, said gear having a cylindrical metal bearing surface cooperating with said shell, and a non-metallic end bearing secured on said gear and cooperating with said exposed upper metal end of said bearing core to form therewith a thrust bearing, said gear supporting member having a hole into which the lower end of the core and shell of said bearing member fit snugly to hold said shell from rotating about said core.

ROBERT S. BASSETT.